(12) United States Patent
Hattikudru et al.

(10) Patent No.: US 9,652,766 B1
(45) Date of Patent: May 16, 2017

(54) MANAGING DATA STORED IN MEMORY LOCATIONS HAVING SIZE LIMITATIONS

(71) Applicant: AMAZON TECHNOLOGIES, INC., Reno, NV (US)

(72) Inventors: Abhin Hattikudru, Bangalore (IN); Ajay Bhutani, Faridabad (IN); Chelsea Celest Krueger, Seattle, WA (US); Anantharam Vanchiprakash, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 287 days.

(21) Appl. No.: 13/973,733

(22) Filed: Aug. 22, 2013

(51) Int. Cl.
*G06Q 40/00* (2012.01)
*G06Q 20/38* (2012.01)
*G06F 12/00* (2006.01)
*G06F 17/21* (2006.01)
*G06F 17/30* (2006.01)

(52) U.S. Cl.
CPC ............. *G06Q 20/38* (2013.01); *G06F 12/00* (2013.01); *G06F 17/21* (2013.01); *G06F 17/30* (2013.01); *G06F 17/30339* (2013.01); *G06F 17/30351* (2013.01); *G06F 17/30362* (2013.01); *G06F 17/30386* (2013.01); *G06Q 40/00* (2013.01)

(58) Field of Classification Search
CPC ......... G06F 17/30351; G06F 17/30362; G06F 17/30; G06F 17/30339; G06F 17/3086
USPC ........................................... 705/39; 707/100
See application file for complete search history.

(56) References Cited

U.S. PATENT DOCUMENTS

| 5,550,976 | A  | * | 8/1996 | Henderson | ........ G06F 17/30607 707/999.01 |
|---|---|---|---|---|---|
| 6,216,173 | B1 | * | 4/2001 | Jones | ..................... G06F 9/4812 709/202 |
| 6,427,152 | B1 | * | 7/2002 | Mummert | |
| 6,760,812 | B1 | * | 7/2004 | Degenaro | ........... G06F 12/0888 707/E17.12 |
| 6,850,938 | B1 | * | 2/2005 | Sadjadi | ............. G06F 17/30362 |
| 7,167,881 | B2 | * | 1/2007 | Yasuda | ............... G06F 12/0276 |
| 7,516,239 | B2 | * | 4/2009 | Poyourow | ......... G06F 17/30483 707/999.01 |
| 7,516,292 | B2 | * | 4/2009 | Kimura | ............... G06F 12/0253 707/999.202 |

(Continued)

OTHER PUBLICATIONS

Ceri, S., Navathe, S., & Wiederhold, G. (1983). Distribution design of logical database schemas. IEEE Transactions on Software Engineering, SE-9(4), 487-504. doi:http://dx.doi.org/10.1109/TSE.1983.234957 Jan. 12, 2017.*

(Continued)

*Primary Examiner* — Kito R Robinson
(74) *Attorney, Agent, or Firm* — Lindauer Law, PLLC (57) ABSTRACT

Described herein are storage systems, computer readable mediums, and methods for overcoming size limit storage limitations associated with storage systems. Processed transactions may be removed from an object so that input data may be stored at the object. In some implementations, the storage system removes the processed transactions from the object once a section of the object includes a threshold amount of data, and stores the processed transactions at a transaction datastore. Once the processed transactions have been removed from the object, the storage system may store the input data at the object.

20 Claims, 6 Drawing Sheets

(56) References Cited

U.S. PATENT DOCUMENTS

| | | | | |
|---|---|---|---|---|
| 8,352,448 B2* | 1/2013 | Haye | ............... | G06F 11/1448 |
| | | | | 707/684 |
| 8,548,913 B2* | 10/2013 | Grube | ............... | G06F 11/1076 |
| | | | | 705/40 |
| 9,076,138 B2* | 7/2015 | Resch | ............... | G06F 11/1076 |
| 2001/0029607 A1* | 10/2001 | Veres | ............... | G06F 8/61 |
| | | | | 717/170 |
| 2002/0016896 A1* | 2/2002 | Siebert | ............... | G06F 12/023 |
| | | | | 711/170 |
| 2003/0004735 A1* | 1/2003 | Dutta | ............... | G06Q 10/10 |
| | | | | 705/325 |
| 2005/0210530 A1* | 9/2005 | Horvitz | ............... | H04N 21/482 |
| | | | | 725/134 |
| 2006/0112136 A1* | 5/2006 | Shankar | ............... | G06F 9/544 |
| 2006/0149703 A1* | 7/2006 | Poyourow | ............... | G06F 17/30483 |
| 2011/0055413 A1* | 3/2011 | Lobsenz | ............... | G06Q 10/06 |
| | | | | 709/231 |
| 2011/0289100 A1* | 11/2011 | Madhavarapu | ... | G06F 17/30286 |
| | | | | 707/769 |
| 2011/0291944 A1* | 12/2011 | Simmons | ............... | G06F 3/0416 |
| | | | | 345/173 |
| 2013/0275266 A1* | 10/2013 | Goff | ............... | G06Q 30/0233 |
| | | | | 705/26.44 |

OTHER PUBLICATIONS

Murer, S., & Farber, P. (1992). A Scalable Distributed Shared Memory. Lecture Notes in Computer Science, 634, 453-466. Retrieved from http://dialog.proquest.com/professional/docview/727020939?accountid=142257 on Jan. 12, 2017.*

* cited by examiner

MANAGING DATA STORED IN MEMORY LOCATIONS HAVING SIZE LIMITATIONS

BACKGROUND

Storage systems may provide memory having locations configured to store data for users. However, the locations may be configured to have particular size limitations for various reasons, such as maintaining consistent performance.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to storage systems and methods for overcoming size limitations associated with storage systems. The storage systems may comprise database services configured to store and retrieve data. In one implementation, a particular storage system is implemented as a service executing on one or more servers, such as in a distributed computing environment.

The storage system may include one or more objects, which are data stored at locations in memory. In one example, the one or more objects may include at least one computer-readable storage media ("CRSM") which stores data for retrieval. The object may comprise data stored as an aggregate data structure. The objects, or sections within these objects, may have data storage size limitations. For example, the objects may be configured to store no more than 64 kilobytes ("KB") of data. As discussed in more detail below, the storage system may use the data storage size limitations to determine whether to perform an update process.

The objects may include data indicating the quantity of data stored in the objects. For example, at a first point in time, a particular object may include data having a size of 10 KB, and at a second point in time, the particular object may include data having a size of 20 KB. Over time, the size of a particular object may increase, approaching the size limitation of the object.

The objects may have one or more sections of data. For example, a particular object may include a processed transaction section configured to store one or more processed transactions. The processed transaction(s) may comprise data representing a unit of data processing resulting from a transaction request. For example, the processed transaction may represent a deposit of money to a user account in response to a user requesting to deposit money in the user account. The money may comprise data which represents value. For example, the money may comprise data representative of frequent fly points, bitcoins, and so forth. In another example, the processed transaction may represent a withdrawal of money to the user account in response to a user purchasing a good from a merchant. The processed transaction may have a state indicating whether the processed transaction is immutable. For example, a particular processed transaction may cause a first service of the storage system to make a call to another service (e.g. an internal or external payment processor), wait for a response, and then update the state. If the first service receives the response and updates the state, the processed transaction becomes immutable. If the first service does not receive the response, the processed transaction remains mutable.

The object may include a section configured to store other data which is associated with the processed transactions. In one example, the other data may comprise data representing an account balance which is determined based on one or more processed transactions. In another example, the other data comprises data representing a value of $100 which indicates that a particular user account has a balance of $100.

The storage system may include a transaction datastore comprising a data structure which is stored on one or more memory devices. In some implementations, the storage system moves the processed transactions from the object to the transaction datastore and stores the processed transactions as historical transactions. In other implementations, the historical transactions may be copies of the processed transactions.

In some implementations, the storage system receives input data from one or more systems (e.g., a server). The input data may represent a new transaction. For example, the new transaction may represent a deposit of money to the user account, or a withdrawal of money from the user account.

In some implementations, the storage system performs an update process once the input data is received. In one example, the update process includes moving processed transactions from the object to a transaction datastore, so that the input data may be inserted into the object. That is, the object may have insufficient space for the input data, and the storage system may create space in the object by moving some processed transactions from the object to a transaction datastore or other datastore. The transaction datastore may comprise a data structure which is stored on one or more memory devices, and may be included within the storage system. In some implementations, the update process includes generating copies of the processed transactions. In these implementations, the update process may include storing the copies of the processed transactions at the transaction datastore as historical transactions. After the copied transactions have been stored at the transaction datastore as the historical transactions, as part of the update process, the storage system may remove the processed transactions from the object, so the input data (e.g., new transactions) may be stored at the object.

In some implementations, the update process includes updating the value located at the object using the input data. In one example, the input data represents a debit of $10 to a user's money account which has a current balance of $40.

In this example, the storage system may update the $40 balance using the debit of $10, such that the money balance is $30.

The update process may include updating the object using an optimistic locking process. For example, the object may include a balance table which includes data representative of a version number. The storage system may read the object and the version number, and once the storage system is ready to update the balance, the storage system checks that the version number of the object has not changed. If the version number has been changed, the storage system may abort the update, and may restart the process of updating the object using the optimistic locking process. If the version number has not changed, the storage system continues to perform the update process and updates the balance.

The object may have a one-to-many relationship with at least one of the processed transactions stored at the object or the historical transactions stored at the transaction datastore. For example, using an object ID, the object may be associated with many processed transactions located at the object, or historical transactions located at the transaction datastore. The one-to-many-relationship between the object and the historical transactions may allow users (e.g., system administrators) to query all of the transactions (i.e., the processed transactions and the historical transactions) associated with the object.

The storage system may insert the input data into the object contemporaneously with an update to a particular value (e.g., the balance of a user account) of the object. The contemporaneous insertion and update may allow for the input data to be inserted and the particular value to be updated in an atomic fashion. That is, the insertion and update may each be committed, and if any issues occur during the contemporaneous insertion and update, the storage system may perform a rollback function. The rollback function returns the storage system to a previous state and restores the storage system such that any issues which may have occurred during the contemporaneous insertion and update do not affect the data stored at the storage system.

By performing the update process various benefits are provided to users such as administrative users and software developers. In one example, by moving processed transactions from objects which reach a certain storage capacity, new space is provided for new transactions, and developers may enforce size limits associated with the objects, which may be desired to optimize an application.

Illustrative System

Figure 1:
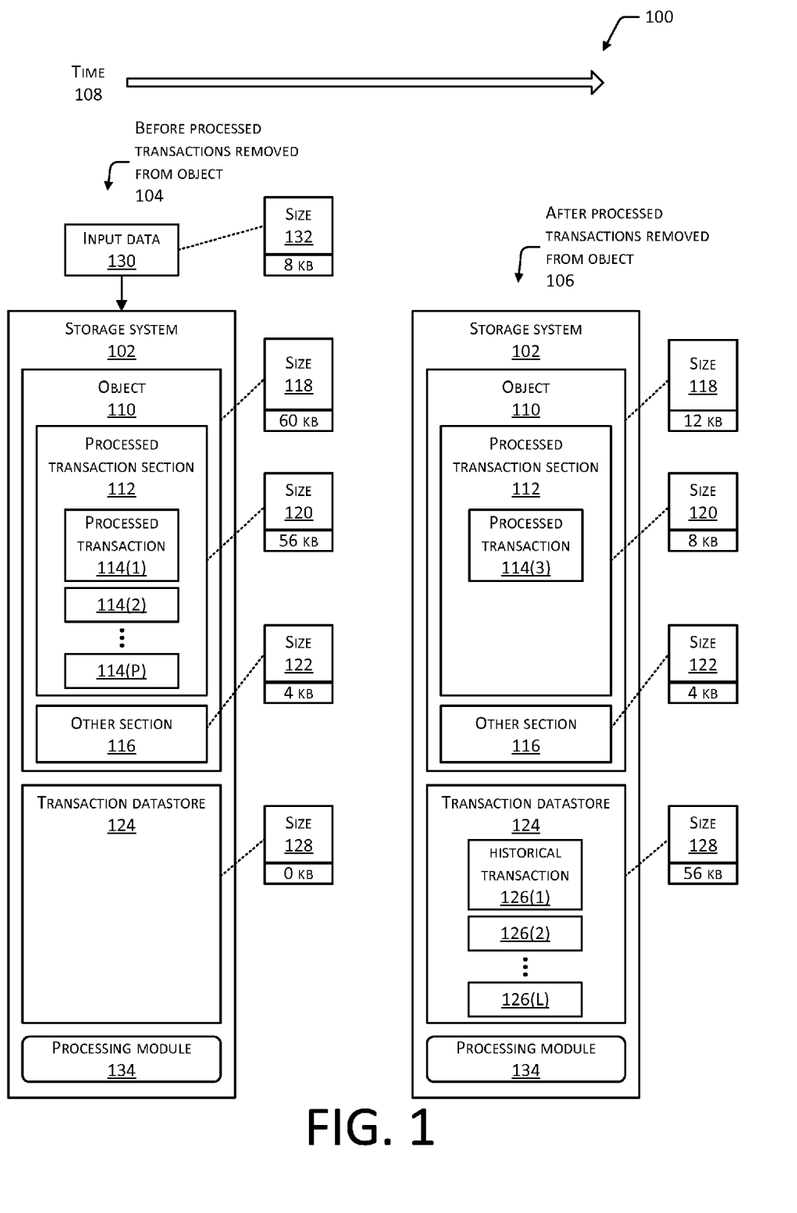
FIG. 1 is a block diagram of a storage system configured to store historical transactions at a transaction datastore, and store input data at an object.

FIG. 1 is a block diagram 100 of a storage system 102 configured to store the historical transactions at the transaction datastore, so that the input data may be stored at the object. In FIG. 1, the storage system 102 is depicted at the following two points in time: before the processed transactions are removed from the object 104; and after the processed transactions are removed from the object 106. In this illustration, time increases across the page, as indicated by the arrow 108. The storage system 102 may comprise one or more database services configured to store and retrieve data. In some implementations, the storage system 102 is implemented as a service executing on one or more servers, such as in a distributed computing environment.

In FIG. 1, the storage system 102 includes one or more objects 110. The one or more objects 110 may comprise locations in memory configured to store data. The object 110 may be associated with a user account which is associated with a user. In one example, the user account comprises data representing a money balance and information about the associated user. The information about the user may include data representative of the user's name, address, phone number, and so forth.

In some implementations, the object 110 includes one or more sections. For example, in FIG. 1, the object 110 includes a processed transaction section 112 configured to store one or more processed transactions 114(1), 114(2), . . . 114(P). The processed transactions 114(1), 114(2), . . . 114(P) may comprise data representing units of data processing resulting from transaction requests. For example, the processed transaction 114 may represent a deposit of money to a particular user account in response to a user requesting to deposit money in the user account. In another example, the processed transaction 114 may represent a withdrawal of money to the user account in response to the user purchasing a good from a vendor. The processed transaction 114 may have a state indicating whether the processed transaction 114 is immutable or mutable. For example, a particular processed transaction 114 may cause the storage system 102, or a service of the storage system 102, to make a call to another service (e.g. an internal or external payment processor), wait for a response, and then update the state. If the storage system 102 receives the response and updates the state, the processed transaction 114 becomes immutable. If the storage system 102 does not receive the response, the processed transaction 114 remains mutable. The immutable processed transaction 114 may be described as having a state that cannot be modified, and the mutable processed transaction 114 may be described as having a state that may be modified.

In FIG. 1, the object 110 includes other section 116 configured to store other data which is associated with the processed transactions 114(1), 114(2), . . . 114(P). In one example, the other data comprises data representing the money balance associated with the user account.

The object 110 may include data representing a size 118 which indicates the quantity of data stored at the object 110. In this example, before the processed transactions 114 are removed from the object 110, the size 118 indicates that the quantity of data stored at the object is 60 KB. In some implementations, the storage system 102 may determine the quantity of the data stored at the object 110 by adding the quantity of data stored at the processed transaction section 112 and the quantity of data stored at the other section 116. In other implementations, the storage system 102 may determine the quantity of the data stored at the object 110 by adding the quantity of data stored at the processed transaction section 112, the quantity of data stored at the other section 116, and the quantity of data stored at any other sections of the object 110.

The processed transaction section 112 may include data representing a size 120 which indicates the quantity of data stored at the processed transaction section 112. In this example, before the processed transactions 114 are removed from the object 110, the size 120 indicates that the quantity of data stored at the processed transaction section 112 is 56 KB.

The other section 116 may include data representing a size 122 which indicates the quantity of data stored at the other section 116. In this example, before the processed transactions 114 are removed from the object 110, the size 122 indicates that the quantity of data stored at the other section 116 is 4 KB.

In some implementations, the object 110, or one or more sections of the object 110 (e.g., the processed transaction section 112, and the other section 116), may be associated with data storage size limitations. As described in more detail below, the storage system 102 may use the data storage size limitations to determine whether to perform an update process. In one example, the object 110 may have a data storage size limitation of 64 KB (not shown). In another example, the processed transaction section 112 may have a data storage size limitation (e.g., 50 KB).

The storage system 102 may reconfigure the data storage size limitations associated with the object 110. For example, at a first point in time, the object 110 may be configured to store no more than 64 KB of data, and at a second point in time, the storage system 102 may increase the data storage size limitation of the object 110 such that the object may store no more than 100 KB of data. In another example, the storage system 102 may decrease the data storage size limitation of the object 110 such that the object may store no more than 40 KB of data. By enabling the data storage size limitations to be configurable, users (e.g., developers) may enforce specified data storage limitations for various reasons, such as maintaining consistent performance.

The storage system 102 may include one or more transaction datastores 124 comprising a data structure which is stored on one or more memory devices. In some implementations, the storage system 102 does not include the transaction datastore 124, but rather the transaction datastore 124 is communicatively connected to the storage system 102. As discussed in more detail below, to provide space in the object 110, the storage system 102 may move the processed transactions 114(1), 114(2), . . . 114(P) from the object 110, and store the processed transactions 114(1), 114(2), . . . 114(P) as historical transactions 126(1), 126(2), . . . 126(L), respectively.

The transaction datastore 124 may include data representing a size 128 which indicates the quantity of data stored at the transaction datastore 124. In this example, before the storage system 102 removes the processed transactions 114(1), 114(2), . . . 114(P) from the object 110, the size 128 indicates that the quantity of data stored at the transaction datastore 124 is 0 KB.

In FIG. 1, the storage system 102 receives input data 130. The input data 130 may represent a new transaction comprising data representing units of data processing resulting from transaction requests. For example, the input data 130 may represent a deposit of money to a particular user account in response to a user requesting to deposit money in the user account. In another example, the input data 130 may represent a request to check a balance of the particular user account associated with the object 110.

In some implementations, the storage system 102 receives the input data 130 from a system (e.g., a server) communicatively coupled using one or more networks. The network facilitating communication between the storage system 102 and the system may include a variety of networks, such as a local network, a wide area network ("WAN"), broadcast network, a personal area network, a wired and wireless local area network ("LAN"), and so forth. In some implementations, the network includes at least one of Ethernet, Wi-Fi™ as promulgated by the Wi-Fi Alliance, 3G and 4G, Bluetooth as promulgated by the Bluetooth Special Interest Group, and so forth. In some implementations, the devices and systems described herein are configured to directly connect to each other. The system may include additional servers which communicate with the storage system 102.

The input data 130 may include data representing a size 132 which indicates the quantity of data stored by the input data 130. In this example, the size 132 indicates that the quantity of data stored by the input data 130 is 8 KB.

In FIG. 1, the storage system 102 includes a processing module 134 which is configured to perform an update process. The update process may include various steps. For example, the update process may include moving the processed transactions 114(1), 114(2), . . . 114(P) from the object 110 to the transaction datastore 124, so that the input data 130 may be inserted into the object 110 as processed transaction 114(3). In this example, the storage system 102 stores the processed transactions 114(1), 114(2), . . . 114(P) at the transaction datastore 124 as historical transactions 126(1), 126(2), . . . 126(L).

In some implementations, the storage system 102 performs the update process in response to a determination that the object 110, or a section of the object 110, includes a threshold amount of data. In FIG. 1, the storage system 102 may perform the update process if the object 110 were to include at least 64 KB of data if the input data 130 is inserted into the object 110. For example, as shown in FIG. 1, the storage system 102 receives the input data 130 having a size 132 of 8 KB of data. The storage system 102 is configured to insert the input data 130 into the object 110, however, the object 110 already has 60 KB of data. Because the object 110 has a size limit of 64 KB, the storage system 102 cannot store the input data 130 at the object 110 because if the input data 130 was stored in the object 110 before removing any of the processed transactions 114, the object 110 would include 68 KB of data which is more than the 64 KB size limit. In FIG. 1, during the update process, the storage system 102 may remove the processed transactions 114(1), 114(2), . . . 114(P) and store the processed transactions 114(1), 114(2), . . . 114(P) as the historical transactions 126(1), 126(2), . . . 126(L) at the transaction datastore 124. In some implementations, the historical transactions 126(1), 126(2), . . . 126(L) are copies of the processed transactions 114(1), 114(2), . . . 114(P), respectively.

In some other implementations, the storage system 102 determines to perform the update process once the processed transaction section 112 includes the threshold amount of data, or once the other section 116 includes the threshold amount of data. In other implementations, the storage system 102 may perform the update process at one or more predetermined times. For example, the storage system 102 may be configured to perform the update process once every twelve hours.

Once the processed transactions 114(1), 114(2), . . . 114(P) are removed from the object, the storage system 102 may store the input data 130 at the object 110. As shown in FIG. 1, the storage system 102 stores the input data 130 at the object 110 as the processed transaction 114(3).

In FIG. 1, after the storage system 102 removes the processed transactions 114(1), 114(2), . . . 114(P) from the object 110 and inserts the input data 130 into the object 110, the size 118 indicates that the quantity of data stored at the object is 12 KB. The size 120 indicates that the quantity of data stored at the processed transaction section 112 is 8 KB, the size 122 indicates that the quantity of data stored at the other section 116 is 4 KB, and the size 128 indicates that the quantity of data stored at the transaction datastore 124 is 56 KB.

In FIG. 1, the storage system 102 may insert the input data 130 into the object 110 contemporaneously with updating the value (e.g., the balance of a user account) which is associated with the processed transactions 114(1), 114 (2), . . . 114(P). The contemporaneous insertion and update may include both the insertion and the updating starting at or near the same time but not finishing at the same time, or both the insertion and updating starting at or near the same time and finishing at or near the same time. The contemporaneous insertion and update may allow for the input data 130 to be inserted and the particular value to be updated in an atomic fashion. That is, the insertion and update may each be committed, and if any issues occur during the contemporaneous insertion and update, the storage system 102 may perform a rollback function which returns the storage system 102 to a previous state and restores the storage system 102 such that any issues which may have occurred during the contemporaneous insertion and update do not affect the data stored at the object 110.

Figure 2:
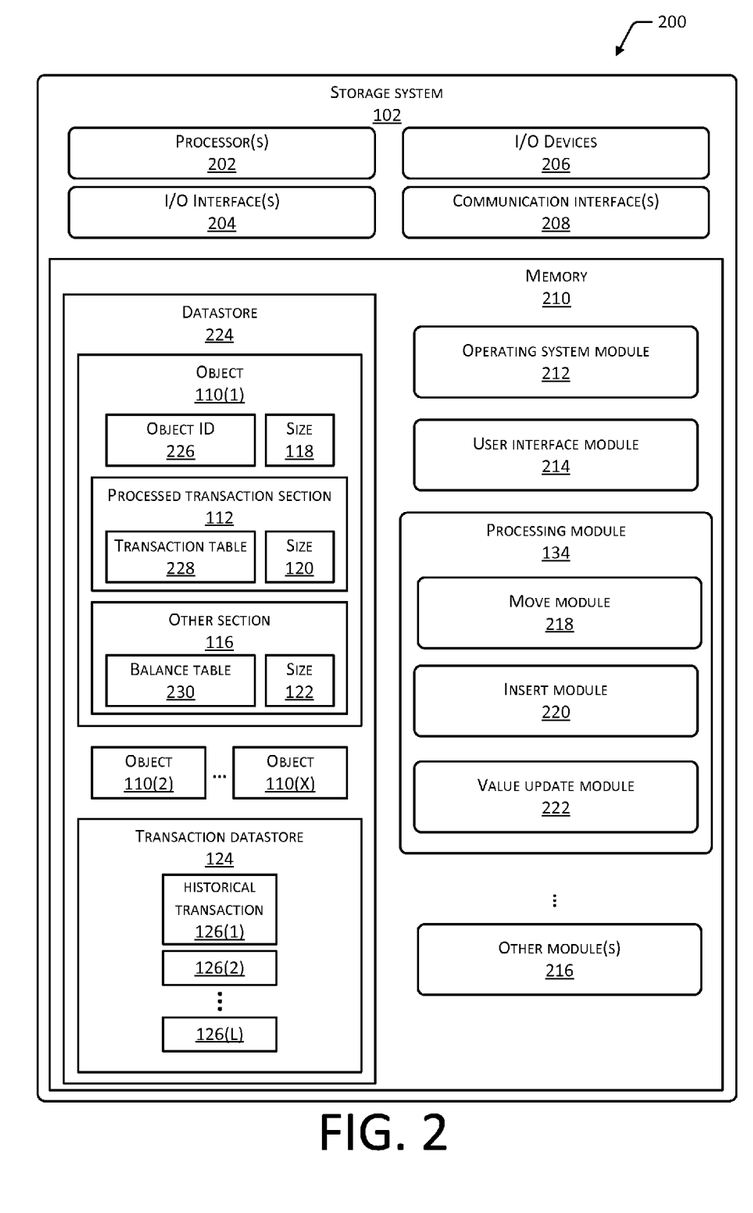
FIG. 2 is a block diagram of the storage system storing objects having a transaction table and a balance table.

FIG. 2 is a block diagram 200 of the storage system 102 including the objects 110(1), 110(2), . . . 110(X) which include transaction tables and balance tables. The storage system 102 may include at least one processor 202 configured to execute stored instructions. The at least one processor 202 may comprise one or more cores.

The storage system 102 includes at least one input/output ("I/O") interface 204 which enables portions of the storage system 102 (e.g., the processor 202) to communicate with other devices. The I/O interface 204 may include inter-integrated circuit ("I2C"), serial peripheral interface bus ("SPI"), Universal Serial Bus ("USB"), RS-232, and so forth. The at least one I/O interface 204 may be communicatively coupled to at least one I/O device 206. In some implementations, certain I/O devices 206 are physically incorporated with the storage system 102 or externally placed.

The storage system 102 may include at least one communication interface 208. The communication interface 208 may be configured to provide communications between the storage system 102 and other devices, such as routers, access points, other storage system 102, and so forth. The communication interface 208 may connect to one or more networks. The storage system 102 may include at least one bus or other internal communications hardware or software that enables for the transfer of data between the various modules and components of the storage system 102.

As illustrated in FIG. 2, the storage system 102 may include at least one memory 210. The memory 210 may include at least one CRSM. The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the storage system 102.

The memory 210 may include at least one operating system ("OS") module 212. The OS module 212 may be configured to manage hardware resources such as the I/O interface 204, the I/O device 206, the communication interface 208, and provide various services to applications or modules executing on the processor 202. The I/O device 206 may include at least one of a display device or speakers. The memory 210 may also store at least one of the following modules which may be executed as foreground applications, background tasks, or daemons.

In some implementations, the memory 210 stores a user interface module 214 configured to provide a user interface to a user using the I/O devices 206 and to accept inputs received from the I/O devices 206. The user interface may include one or more visual, audible, or haptic elements. For example, the user interface may be configured to provide a graphic user interface, an audible user interface, and so forth. Also stored in the memory 210 may be the processing module 134 and other modules 216.

As described above, the processing module 134 may be configured to perform the update process. In some implementations, the processing module 134 includes a move module 218, an insert module 220 and a value update module 222. The move module 218 may be configured to move one or more of the processed transactions 114 from a particular object 110 to the transaction datastore 124. In some implementations, the move module 218 is configured to move the processed transactions 114 by copying the processed transactions 114 to generate copies of the processed transactions 114, and storing the copies of the processed transactions at the transaction datastore 124. In these implementations, after the move module 218 stores the copies of the processed transactions at the transaction datastore 124, the move module 218 may be configured to remove the processed transactions 114 from the object 110.

The insert module 220 may be configured to insert the input data 130 into the object 110. In other words, the insert module 220 may be configured to store the input data 130 at the object 110.

The value update module 222 may be configured to update the value located at the object 110 using the input data 130. For example, the input data 130 may represent a credit of $100 to a user's money account which has a current balance of $200. In this example, the value update module 222 may update the $200 balance using the credit of $100, such that the money balance is updated to $300.

In some implementations, the memory 210 includes a datastore 224 for storing information. The datastore 224 may use a flat file, database, linked list, code, tree or other data structure to store the information. In some implementations, the datastore 224, or a portion thereof, may be distributed across at least one other device, such as another storage system 102, a server, a network storage device, and so forth. As illustrated in FIG. 2, the datastore 224 may include the objects 110(1), 110(2), . . . 110(X) and the transaction datastore 124.

In FIG. 2, the object 110(1) includes data representing an object ID 226 which comprises data representing an identification of the object 110(1). The objects 110(1), 110(2), . . . 110(X) may include a unique object ID 226 which is used to identify the object 110(1), 110(2), . . . 110(X).

In some implementations, the object 110(1) may include the data representing the size 118 of the quantity of data stored at the object 110(1). As discussed above, the storage system 102 may use the size 118 to determine whether to perform the update process.

The object 110(1) may include the processed transaction section 112. As shown in FIG. 2, the processed transaction section 112 may comprise one or more transaction tables 228. Data stored in the transaction table 228 may be visualized as organized in columns and rows. In one implementation, a particular row of the transaction table 228 comprises a particular processed transaction 114. Other examples of information in fields of data which may be included in the processed transaction section 112 are discussed in more detail below with regard to FIG. 3.

The processed transaction section 112 may include the data representing the size 120 which represents the quantity of data stored at the processed transaction section 112. As discussed above, the storage system 102 may use the size 120 to determine whether to perform the update process.

The object 110(1) may include the other section 116. In one example, the other section 116 may comprise a balance table 230. Data stored in the balance table 230 may be visualized as organized in columns and rows. In one implementation, a particular row of the balance table 230 comprises data representing the value which represents a particular balance. Other examples of information in fields of data which may be included in the balance table 230 are discussed in more detail below with regard to FIG. 3.

The other section 116 may include the data which represents the size 122 that indicates the quantity of data stored at the other section 116. As discussed above, the storage system 102 may use the size 120 to determine whether to perform the update process.

As discussed above, the transaction datastore 124 may be configured to store the historical transactions 126(1), 126(2), . . . 126(L). The transaction datastore 124 may comprise a data structure which is stored on one or more memory devices. In some implementations, the historical transactions 126(1), 126(2), . . . 126(L) may be copies of the processed transactions 114(1), 114(2), . . . 114(P), respectively. In some implementations, the historical transactions 126(1), 126(2), . . . 126(L) may comprise the processed transactions 114(1), 114(2), . . . 114(P) themselves, which have been moved from the object 110 to the transaction datastore 124 by the move module 218.

Figure 3:
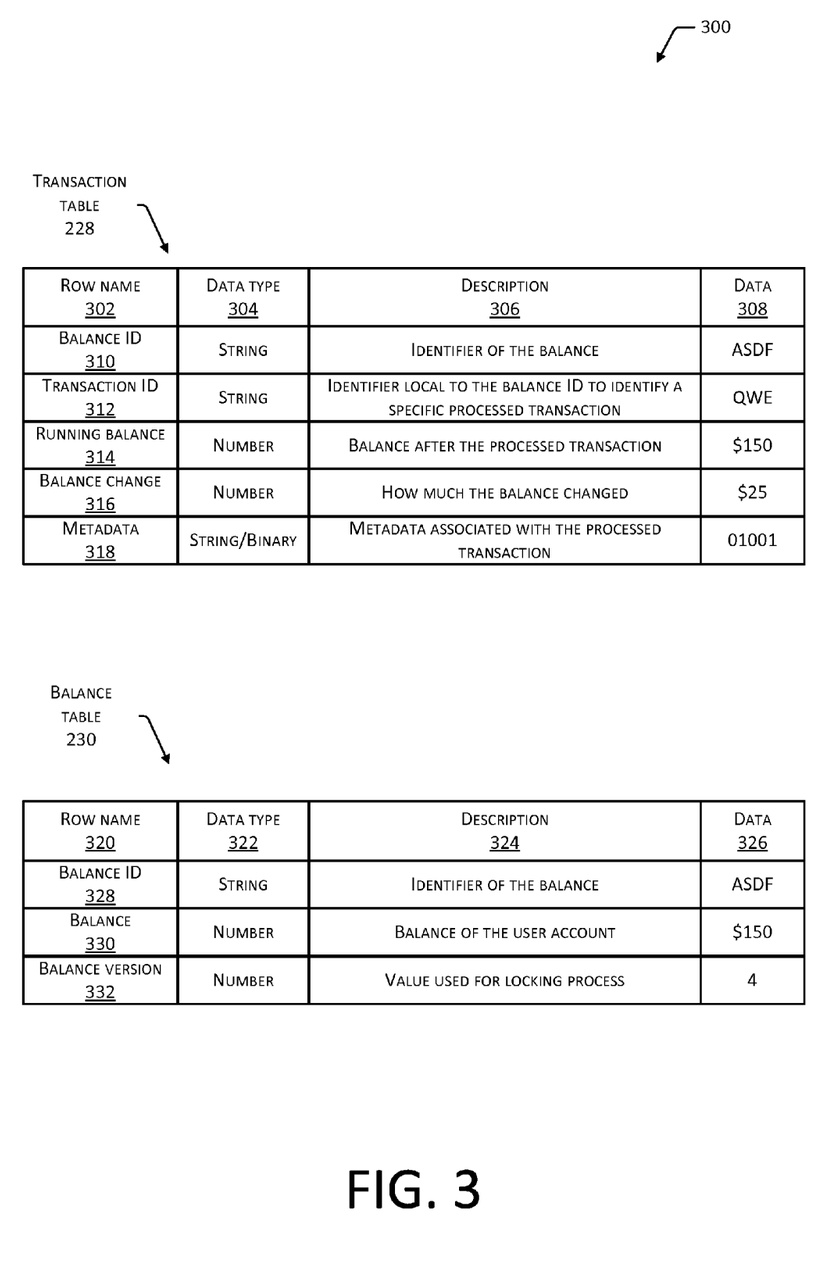
FIG. 3 illustrates an example transaction table and balance table having fields of data.

FIG. 3 illustrates examples of the transaction table 228 and the balance table 230. The transaction table 228 includes data which may be characterized as being organized in columns and rows. The transaction table 228 may comprise information which includes the following fields: row name 302; data type 304; description 306; and data 308. In this implementation, the row name 302 includes data representative of a unique identifier associated with a particular row of the transaction table 228. For example, in FIG. 3, the row names 302 of the transaction table 228 include: balance ID 310; transaction ID 312; running balance 314; balance change 316; and metadata 318. The data type 304 may comprise data representative of the type of data that is stored at the data 308. For example, the data type may comprise at least one of a string value, a number value, or a binary value. The description 306 may comprise data representing a description of the type of data stored by a particular row of the transaction table 228. The data 308 may comprise values of the rows of the transaction table 228.

The balance ID 310 may comprise data representing a unique identifier of the balance of a user account that is associated with a particular object 110. In FIG. 3, the data 308 for the balance ID 310 includes the value "ASDF", which is a unique identifier of the balance of a particular user account that is associated with the object 110(1).

The transaction ID 312 may comprise data representing a unique identifier associated with a particular processed transaction 114. In FIG. 3, the data 308 for the transaction ID 312 includes the value "QWE", which represents a unique identifier of the transaction ID 312.

The running balance 314 may comprise data representing a sum total of money that is present in the user account associated with the balance ID 310. In FIG. 3, the data 308 for the running balance 314 includes the value "$150", indicating that the sum total of money present for the user account is $150.

The balance change 316 may comprise data representing how much the balance has changed between designated processed transactions 114 or during a designated time period. In FIG. 3, the data 308 for the balance change 316 includes the value "$25", indicating that the balance has increased $25 since the last processed transaction 114.

The metadata 318 may comprise data associated with the processed transaction 114. The value 308 for the metadata 318 includes the value "01001". This value "01001" may represent various metadata. For example, the value "01001" may indicate a specific location of a merchant in which the last processed transaction 114 was conducted.

The balance table 230 may comprise information which includes the following fields: row name 320; data type 322; description 324; and data 326. The row name 320 may include data representative of a unique identifier associated with a particular row of the balance table 230. For example, in FIG. 3, the row names 320 of the balance table 230 include: balance ID 328; balance 330; and balance version 332. The data type 322 may comprise data representative of the type of data that is stored at the data 326. For example, the data type 322 for the balance ID 328 is "String", the data type 322 for the balance 330 is "Number", and the data type 322 for the balance version 332 is "Number".

The description 324 may comprise data representing a description of the type of data stored by a particular row of the balance table 230. For example, the description 324 for the balance ID 328 includes "Identifier of the balance", describing that the balance ID 328 includes a unique identification for the balance 330. The description 324 for the balance 330 includes "Balance of the user account", describing that the balance 330 represents the balance of money included in the user account. The description 324 for the balance version 332 includes "Value used for locking process", describing that the balance version 332 represents a value that is used by the storage system 102 during a locking process such as the optimistic locking process described above.

The data 326 may comprise values of the rows of the balance table 230. For example, the data 326 for the balance ID 328 is "ASDF", the data 326 for the balance 330 is "$150", and the data 326 for the balance version is 332 is "4".

The balance ID 310 may comprise data representing a unique identifier of the balance of a user account that is associated with a particular object 110. In FIG. 3, the information associated with the balance ID 328 is the same information associated with the balance ID 310 illustrated above at the transaction table 228.

The balance 330 may comprise data representing an available amount of money in the user account that is available for immediate withdrawal. The balance version 332 may comprise data representing a version associated with the balance 330. The balance version 332 may be used during the optimistic locking process described above.

Figure 4:
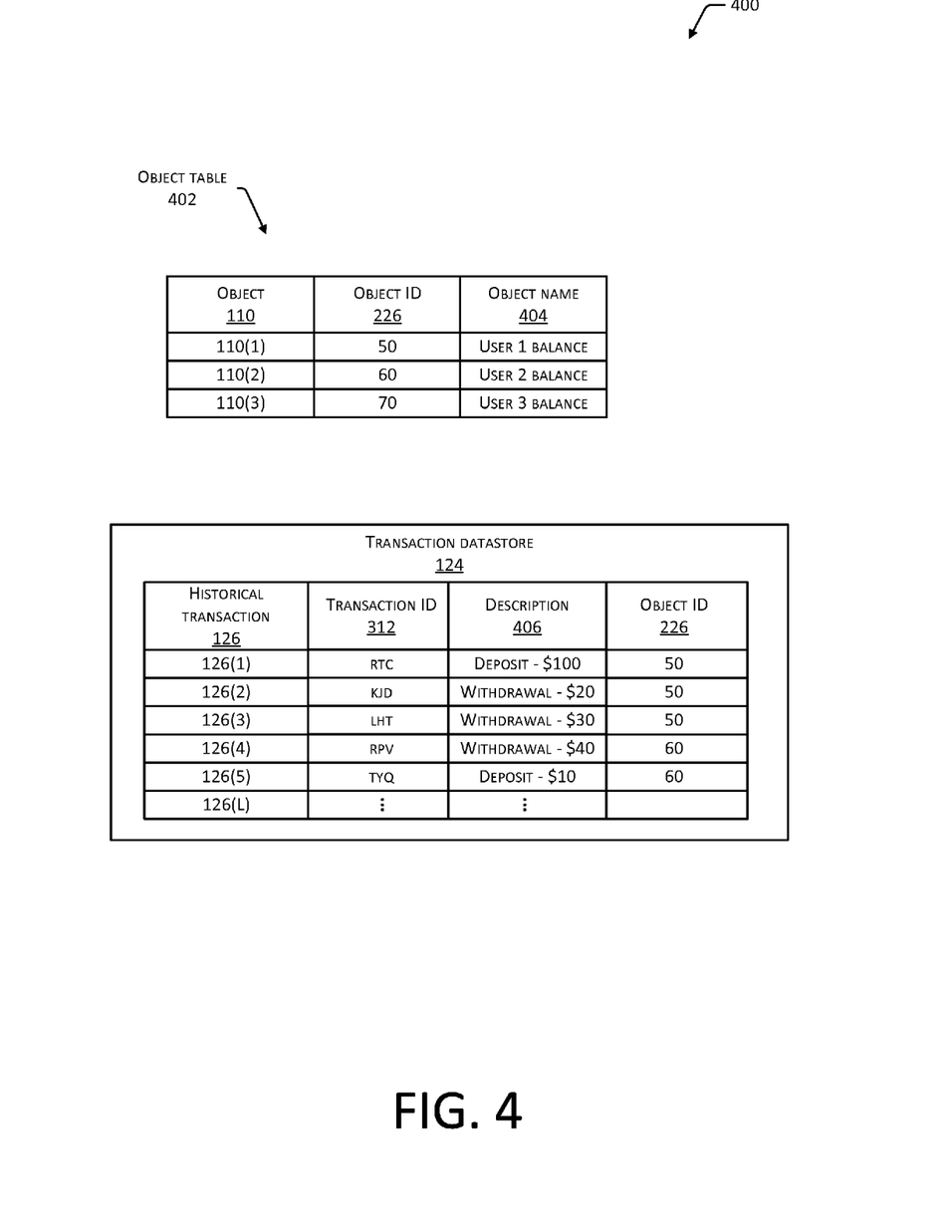
FIG. 4 illustrates the objects having a one-to-many relationship with the historical transactions.

FIG. 4 illustrates certain objects 110 having a one-to-many relationship with certain historical transactions 126. In this example, an object table 402 includes the objects 110(1), 110(2) and 110(3) which are associated with a particular unique object ID 226 and a particular unique object name 404. The object 110(1) is associated with the object ID 226 having a value of "50". The object 110(1) is also associated with an object name 404 which provides a description of the object 110(1). In FIG. 4, the object name 404 of the object 110(1) includes "User 1 Balance", indicating that the object 110(1) is associated with a first user's account balance. In this example, the object 110(2) is associated with the object ID 226 having a value of "60". The object 110(2) is also associated with the object name 404 "User 2 Balance", indicating that the object 110(2) is associated with a second user's account balance. In this example, the object 110(3) is associated with the object ID 226 having a value of "70". The object 110(3) is also associated with the object name 404 "User 3 Balance", indicating that the object 110(3) is associated with a third user's account balance.

In FIG. 4, the transaction datastore 124 includes data which may be characterized as being organized in columns and rows. In this example, each row represents a particular historical transaction 126. The transaction datastore 124 includes the historical transactions 126(1), 126(2), 126(3), 126(4), 126(5), . . . 126(L).

In FIG. 4, the historical transactions 126(1), 126(2), 126(3), 126(4), 126(5), . . . 126(L) are associated with the transaction ID 312, the description 406 and the object ID 226. The transaction ID 312 for the historical transaction 126(1) has a unique identifier value of "RTC". The description 406 for the historical transaction 126(1) has a value of "Deposit—$100", indicating that the storage system 102 deposited $100 into the user 1 balance associated with the object 110(1) by referring to the object ID 226 of "50".

The transaction ID 312 for the historical transaction 126(2) has a unique identifier value of "KJD". The description 406 for the historical transaction 126(2) has a value of "Withdrawal—$20", indicating that the storage system 102 withdrew $20 from the user 1 balance associated with the object 110(1).

The transaction ID 312 for the historical transaction 126(3) has a unique identifier value of "LHT". The description 406 for the historical transaction 126(3) has a value of "Withdrawal—$30", indicating that the storage system 102 withdrew $30 from the user 1 balance associated with the object 110(1).

The transaction ID 312 for the historical transaction 126(4) has a value of "RPV", which is a unique identifier for the historical transaction 126(4). The description 406 for the historical transaction 126(4) has a value of "Withdrawal—$40" indicating that the storage system 102 withdrew $40 from the user 2 balance associated with the object 110(2).

The transaction ID 312 for the historical transaction 126(5) has a value of "TYQ", which is a unique identifier for the historical transaction 126(5). The description 406 for the historical transaction 126(5) has a value of "Deposit—$10" indicating that the storage system 102 deposited $10 into the user 2 balance associated with the object 110(2)

The one-to-many-relationship between the object and the historical transactions may allow users (e.g., system administrators) to query the processed transactions 114 and the historical transactions 126 which are associated with a particular object 110. In FIG. 4, the historical transactions 126(1), 126(2) and 126(3) are associated with the object 110(1) because the historical transactions 126(1), 126(2) and 126(3) and the object 110(1) include the same object ID 226 (i.e., "50"). The historical transactions 126(4) and 126(5) are associated with the object 110(2) because the historical transactions 126(4) and 126(5) and the object 110(2) include the same object ID 226 (i.e., "60").

Figure 5:
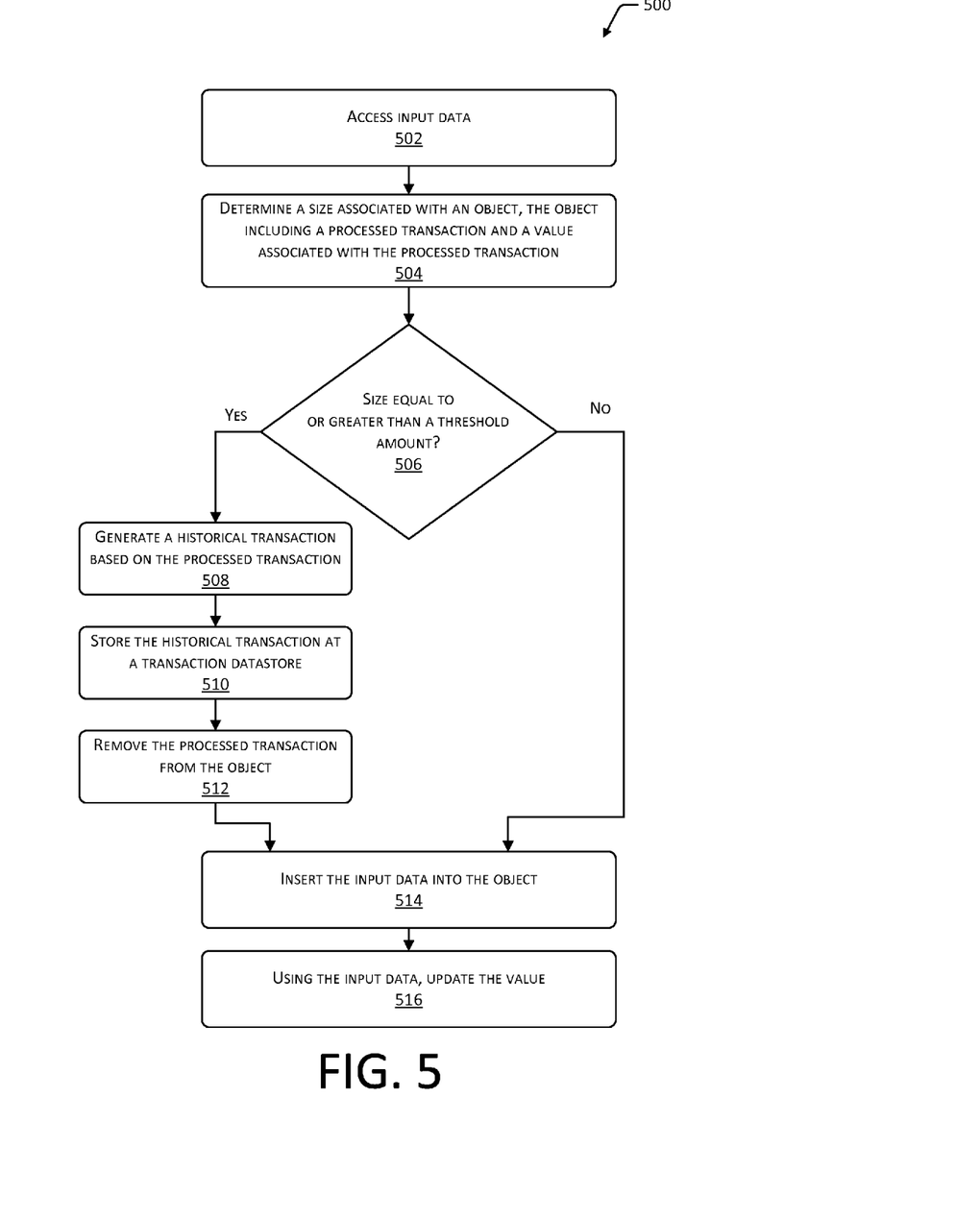
FIG. 5 is a flow diagram illustrating a process of determining a size associated with the object and removing one or more processed transactions in response to the size being equal to or greater than a threshold amount.

FIG. 5 is a flow diagram 500 illustrating a process of determining a size associated with the object 110 and removing one or more processed transactions 114 in response to the size associated with the object 110 being equal to or greater than a threshold amount. Although the process 500 is described with reference to the flow diagram illustrated in FIG. 5, many other methods performing the acts associated with the process 500 may be used. For example, the order of many of the steps may be changed, some of the steps described may be optional, and additional steps may be included.

At block 502, the storage system 102 accesses the input data 130. The input data 130 may comprise a unit of data processing resulting from a transaction request. In one example, the input data 130 comprises data representative of: a first credit of money to a particular user account; or a first debit of money to the user account.

At block 504, the storage system 102 determines a size associated with the object 110, the object 110 including the processed transaction 114 and the value associated with the processed transaction 114. The object 110 may comprise data stored at a location in memory 210. The object 110 may include a first section including the processed transaction 114, and a second section including the value associated with the processed transaction 114. In one example, the processed transaction 114 comprises data representative of: a deposit of money to the user account; or a withdrawal of money to the user account. The storage system 102 may determine the size associated with the object 110 by adding amounts of data stored at different sections of the object 110. The size associated with the object 110 may comprise data representing at least one of: the total size of the object (e.g., 60 KB); the size of the first section of the object (e.g., 40 KB); or the size of the second section of the object (e.g., 5 KB).

At decision diamond 506, the storage system 102 determines whether the size is equal to or greater than a threshold amount. In some implementations, the threshold amount is configurable. For example, at a first point in time, the threshold amount may be 64 KB. At a second point in time, based on a user request, the threshold amount may be 100 KB.

At block 508, the storage system 102 generates the historical transaction 126 based on the processed transaction 114. In some implementations, the storage system 102 generates the historical transaction 126 by copying the processed transaction 114. In other implementations, the historical transaction 126 is the processed transaction 114, the difference being that the historical transaction 126 is stored at the transaction datastore 124 and the processed transaction 114 is stored at the object.

At block 510, in response to the determination that the size is equal to or greater than the threshold amount, the storage system 102 stores the historical transaction 126 at the transaction datastore 124. The transaction datastore 124 may be located within the storage system 102. In some implementations, the storage system 102 is communicatively coupled to the transaction datastore 124.

At block 512, in response to the determination that the size is equal to or greater than the threshold amount, the storage system 102 removes the processed transaction 114 from the object 110. In some implementations, the storage system 102 removes the processed transaction 114 by deleting the processed transaction 114 from the object 110. The storage system 102 may be configured to remove the processed transaction 114 only after the processed transaction 114 is stored as the historical transaction 126 or copied into the transaction datastore 124.

In some implementations, the storage system 102 may be configured to determine which processed transactions 114 to remove from the object. In one example, the storage system 102 determines to remove the oldest processed transactions 114. In another example, the storage system 102 determines to remove the processed transactions 114 which are less frequently updated or processed when compared to the other processed transactions 114 in the object 110.

At block 514, after the processed transaction 114 is removed from the object 110, or in response to the determination that size is less than the threshold amount, the storage system 102 inserts the input data 130 into the object 110. In some implementations, the storage system 102 inserts the input data 130 by copying the input data 130 into the object 110. The input data 130 may be inserted into the object 110 by saving the input data 110 at the object 110.

At block 516, using the input data 130, the storage system 102 updates the value associated with the processed transaction 114. In one example, the input data 130 represents a deposit of $100 into a particular user account which includes a balance of $300. In this example, using the deposit of $100, the storage system 102 updates the balance of $300 such that after the update the balance is $400. In this example, once the storage system 102 stores the input data 130 into the object 110, the input data 130 becomes the processed transaction 114.

In some implementations, using the input data 130, the storage system 102 may update one or more historical transactions 126. For example, a particular historical transaction 126 may include data representing a previous purchase of an item. The storage system 102 may remove the particular historical transaction 126 from the transaction datastore 124 and cause the object 110 to store the particular historical transaction 126. Causing the object 110 to store the particular historical transaction 126, may cause the storage system 102 to remove one or more processed transactions 114 from the object 110 and insert the removed processed transactions 114 into the transaction datastore 124 to make space for the particular historical transaction 126. Once the object 110 stores the particular historical transaction 126, the storage system 102 may update the particular historical transaction 126 using the input data 130. The input data 130 may comprise data representing a refund of the purchase price associated with the particular historical transaction 126. The storage system 102 may update the particular historical transaction 126 by updating the particular historical transaction 126 to include data representing that the purchase price associated with the particular historical transaction 126 has been refunded.

Figure 6:
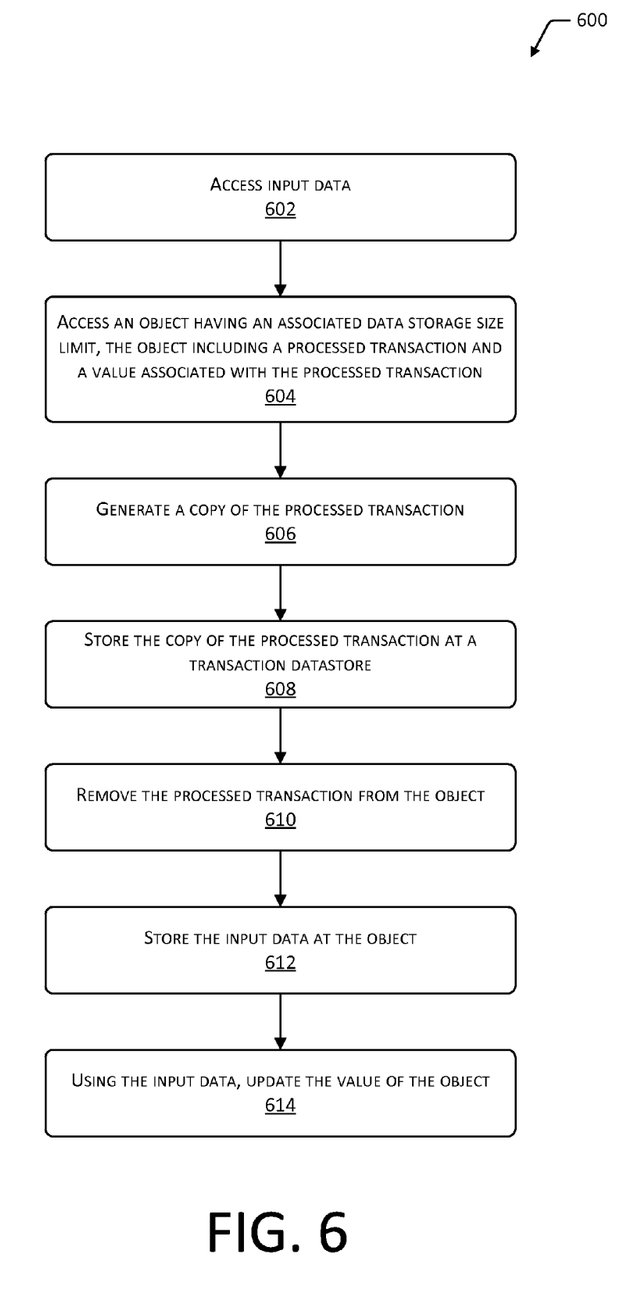
FIG. 6 is a flow diagram illustrating a process of generating a copy of the processed transaction and copy of the processed transaction at the transaction datastore.

FIG. 6 is a flow diagram illustrating a process 600 of generating a copy of the processed transaction 114, and storing the copy of the processed transaction 114 at the transaction datastore 124. Although the process 600 is described with reference to the flow diagram illustrated in FIG. 6, many other methods performing the acts associated with the process 600 may be used. For example, the order of many of the steps may be changed, some of the steps described may be optional, and additional steps may be included.

At block 602, the storage system 102 accesses the input data 130. In one example, the storage system 102 accesses the input data 130 from the memory 210. At block 604, the storage system 102 accesses the object 110 which is associated with a data storage size limit, the object 110 including the processed transaction 114 and the value associated with the processed transaction 114. The data storage size limit may comprise data representing a data storage size limit of the object 110, the transaction section 112, or the other section 116. As described above, the storage system 102 may use the data storage size limit to determine whether to perform the update process. In one example, the value associated with the processed transaction 114 comprises data representative of the balance 330.

At block 606, the storage system 102 generates a copy of the processed transaction 114. The storage system 102 may generate the copy of the processed transaction 114 once the amount of data stored at the object 110 is equal to or greater than a predetermined threshold size. For example, the predetermined threshold size may be 60 KB. In this example, the storage system 102 generates the copy of the processed transaction 114 once the amount of data stored at the object is equal to or greater than 60 KB.

At block 608, the storage system 102 stores the copy of the processed transaction 114 at the transaction datastore 124. When the object 110 includes more than one processed transaction 114, the storage system 102 may store copies of each of the processed transactions 114 at the transaction datastore 124. The transaction datastore 124 may be located separate from the object 110.

In some implementations, the storage system 102 stores the copy of the processed transaction 114 at a reliable or durable queue rather than the transaction datastore 124. The reliable or durable queue may be described as a data structure used to transmit information to the transaction datastore 124. The copy of the processed transaction 114 may be stored at the reliable or the durable queue because the transaction datastore 124 may be unavailable. After the copy of the processed transaction 114 is stored at the reliable or durable queue, at a later point in time, the copy of the processed transaction 114 may be moved to the transaction datastore 124. Storing the copy of the processed transaction 114 at a reliable or durable queue may reduce the dependency on the availability of the transaction datastore 124.

At block 610, the storage system 102 removes the processed transaction 114 from the object 110. In some implementations, the storage system 102 removes the processed transaction 114 from the object 110 after the copy of the processed transaction is stored at the transaction datastore 124. The object 110 may include more than one processed transaction 114, and the storage system 102 may be configured to remove each processed transaction 114 within the object 110. The storage system 102 may be configured to remove the processed transaction 114 in response to the storage system 102 receiving the input data 130.

At block 612, the storage system 102 stores the input data 130 at the object 110. The storage system 102 may store the input data 130 at the object 110 by inserting the input data 130 into the object 110. At block 614, using the input data 130, the storage system 102 updates the value associated with the object 110. For example, the input data 130 may represent a withdrawal of $50 from a user account having a balance of $300. In this example, the storage system 102 may use the withdrawal of $50 to update the balance, such that the balance is $250. In some implementations, the object 110 includes more than one balance table 230 each having different values associated with the object 110. In these implementations, the storage system 102 may update the different values using the input data 130.

In some implementations, the object 110 includes a first section storing the processed transaction 114. In one example, the first section may include the transaction table 228 which includes a plurality of processed transactions 114. In this example, the storage system 102 may generate copies of the processed transactions 114, and store the copies of the processed transactions 114 at the transaction datastore 124. After storing the copies of the processed transactions 114 at the transaction datastore 124, the storage system 102 may remove the plurality of processed transactions 114 from the object 110.

The object 110 may include a second section storing the value associated with the processed transaction 114. In one example, the second section may include the balance table 230 which includes the value associated with the processed transaction 114, data representative of the balance ID 328, and data representative of the balance version 332.

The storage system 102 may be configured to perform an optimistic locking process when the storage system 102 performs the update process. In one example, the optimistic locking process includes reading the balance version 332 which is associated with a particular object 110 when storing one or more processed transactions 114 at the transaction datastore 124. In this example, the optimistic locking process also includes checking the balance version 332 before updating the value of the balance table 230.

The storage system 102 may store the object 110 at one or more slave devices which are communicatively coupled to the storage system 102. The one or more slave devices may be configured to synchronize to the storage system at predetermined time periods. For example, once a day at midnight local time the one or more slave devices may be configured to synchronize with the storage system 102.

In some implementations, the update process comprises: accessing the object 110 associated with the data storage size limit; generating the copy of the processed transaction 114; storing the copy of the processed transaction 114 at the transaction datastore 124; removing the processed transaction 114 from the object 110; storing the input data 130 at the processed transaction section 114; and using the input data 130, updating the value of the other section 116 of the of the object 110. The update process may also include determining the size associated with the object 110.

The storage system 102 may be configured to perform the update process based on various events. In one example, the storage system 102 performs the update process in response to the receiving the input data 130. In another example, the storage system 102 performs the update process in response to a determination that the input data 130 has failed to be written to the object 110.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
  a processor; and
  a memory device communicatively coupled to the processor, the memory device storing instructions which when executed by the processor, cause the processor to:
    access input data comprising a unit of data processing resulting from a transaction request, the input data having a first data size;
    determine a memory associated with an object, the object including:
      a first section including one or more processed transactions, the one or more processed transactions having a second data size representing a quantity of data of the one or more processed transactions stored at the first section; and
      a second section including a value associated with the one or more processed transactions and having a third data size, the object having a fourth data size being a sum of the second data size and the third data size;
    in response to a sum of the first data size and the fourth data size being equal to or greater than a threshold amount:
      generate a historical transaction from the one or more processed transactions to result in a historical transaction data size equal to the second data size;
      store the historical transaction at a transaction datastore at one or more memory locations of the memory device, the transaction datastore having the second data size;
      remove the one or more processed transactions having the second data size from the first section of the object to reduce the fourth data size by the second data size;
      insert the input data into the first section of the object to increase the fourth data size by the first data size; and
      using the input data, update the value of the second section of the object; and
    in response to the sum of the first data size and the fourth data size being less than the threshold amount:
      insert the input data into the first section of the object to increase the second data size by the first data size; and
      using the input data, update the value of the second section of the object.

2. The system of claim 1, wherein:
  the memory associated with the object includes data representative of:
    an amount of data in the first section;
    an amount of data in the second section;
    an amount of data in the first section and the second section; or
    an amount of data in the first section, the second section and any other section.

3. The system of claim 1, wherein:
  the input data comprises data representative of one or more of: a first deposit of money to a user account; or a first withdrawal of money from the user account;
  the one or more processed transactions comprise data representative of one or more of: a second deposit of money to the user account; or a second withdrawal of money from the user account; and
  the value comprises data representative of a money balance.

4. The system of claim 1, wherein the second data size associated with the object is determined:
  in response to receiving the input data; or
  at a predetermined time.

5. A computer readable medium storing instructions, which when executed by a processor, cause the processor to perform actions comprising:
  accessing input data, the input data comprising a unit of data processing resulting from a transaction request and having an input data size;

performing an update process comprising:
accessing an object associated with a data storage size limit, the object comprising data stored at a location in memory, the object having an object data size including:
a first section storing one or more processed transactions, the one or more processed transactions having a processed transaction data size representing a quantity of data of the one or more processed transactions stored at the first section; and
a second section storing a value associated with the one or more processed transactions the second section having a size associated with the value stored therein; and
in response to determining a sum of the input data size and the object data size being equal to or greater than a threshold amount:
generating a copy of the one or more processed transactions, the copy of the processed transaction having the processed transaction data size;
storing the copy of the processed transaction having the processed transaction data size at a transaction datastore to increase the transaction datastore by the processed transaction data size;
removing the processed transaction having the processed transaction data size from the first section of the object to reduce the object data size by the processed transaction data size;
storing the input data at the first section of the object to increase the object data size by the input data size; and
using the input data, to update the value of the second section of the object.

6. The computer readable medium of claim 5, wherein the removal of the one or more processed transactions from the object occurs after the storage of the copy of the one or more processed transactions at the transaction datastore.

7. The computer readable medium of claim 5, wherein the one or more processed transactions is removed from the object in response to the input data being received by the processor.

8. The computer readable medium of claim 5, wherein:
the update process further comprises determining the object data size by adding an amount of data stored at the first section and the processed transaction data size representing a quantity of data of the one or more processed transactions stored at the first section; and
the update process occurs in response to the sum of the input data size and the object data size being equal to or greater than a predetermined threshold amount.

9. The computer readable medium of claim 5, wherein:
the input data is representative of: a first deposit of money to a user account; or a first withdrawal of money from the user account; and
the one or more processed transactions are representative of: a second deposit of money to the user account; or a second withdrawal of money from the user account.

10. The computer readable medium of claim 5, wherein:
the object is stored at a first location; and
the transaction datastore is stored at a second location.

11. The computer readable medium of claim 5, wherein:
the first section stores a transaction table which includes the one or more processed transactions and a second processed transaction; and
the update process further comprises:
generating a second copy of the second processed transaction;
storing the second copy of the second processed transaction at the transaction datastore; and
after storing the second copy of the second processed transaction at the transaction datastore, removing the second processed transaction from the first section.

12. The computer readable medium of claim 5, wherein:
the value comprises data representative of a money balance; and
the second section includes a balance table which includes:
the value;
data representative of a balance ID; and
data representative of a balance version.

13. The computer readable medium of claim 5, wherein the threshold amount is 64 KB.

14. The computer readable medium of claim 5, the actions further comprising storing the object at one or more slave devices.

15. A system comprising:
a processor; and
a memory device communicatively coupled to the processor, the memory device storing instructions which when executed by the processor, cause the processor to:
receive input data comprising a unit of data processing resulting from a transaction request and having a first data size;
perform an update process comprising:
determining a second data size associated with an object, the object comprising data stored at a location in the memory device, the object including:
a processed transaction table comprising data representative of a first processed transaction and a second processed transaction, the first processed transaction and the second processed transaction having a third data size representing a quantity of data of the first processed transaction and the second processed transaction stored at the processed transaction table; and
a balance table comprising data having a fourth data size, the data representative of a value associated with the first processed transaction and the second processed transaction, the value comprising data representative of a money balance; and
in response to a sum of the first data size and the second data size being equal to or greater than a threshold amount:
storing the first processed transaction and the second processed transaction having the third data size at a transaction datastore;
removing the first processed transaction and the second processed transaction having the third data size from the processed transaction table to reduce the second data size associated with the object by the third data size;
storing the input data at the processed transaction table to increase the second data size associated with the object by the first data size; and
using the input data, updating the value of the balance table.

16. The system of claim 15, wherein the update process occurs in response to the sum of the first data size associated with the input data and the second data size associated with the object being equal to or greater than a threshold amount.

17. The system of claim 15, wherein the update process includes using an optimistic locking process which includes:
   reading a balance version number associated with the object when storing the first processed transaction and the second processed transaction at the processed transaction table; and
   checking the version number before updating the value associated with a balance of the processed transaction table.

18. The system of claim 15, wherein:
   the first processed transaction includes data representative of a balance ID; and
   the balance table includes data representative of the balance ID.

19. The system of claim 15, wherein the object comprises data stored as an aggregate data structure.

20. The system of claim 15, wherein:
   the object is associated with a user account which is associated with a user; and
   the object has a maximum data storage size which is configurable.

\* \* \* \* \*